(12) United States Patent
Kitahara

(10) Patent No.: US 6,584,674 B1
(45) Date of Patent: Jul. 1, 2003

(54) METHOD OF PROCESSING ROTOR

(75) Inventor: Haruo Kitahara, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/363,936

(22) Filed: Jul. 30, 1999

(30) Foreign Application Priority Data

Aug. 4, 1998 (JP) .......................................... 10-220215

(51) Int. Cl.[7] .............................................. H02K 15/10
(52) U.S. Cl. .......................... 29/598; 310/40.5; 310/42; 310/156
(58) Field of Search .......................... 29/598; 310/40.5, 310/42, 156; 360/78.13

(56) References Cited

U.S. PATENT DOCUMENTS 5,964,027 A  * 10/1999  Tochiyama .............. 29/603.03

* cited by examiner

Primary Examiner—Carl E. Hall
(74) Attorney, Agent, or Firm—Adams & Wilks

(57) ABSTRACT

A method of processing a rotor of a motor enabling to keep smooth rotation. After the ring-shaped magnet 34 is attached at inner circumference face 31B of an opening portion 31A of a cap-shaped rotor main body through a yoke 33, a rotor shaft portion 31C formed at outside of the main body of the rotor 31 and an attaching hole 31D of a shaft 32 fixed at the main body of the rotor are worked standardizing inner circumference face of the magnet 34. This process can match accurately center line of the magnet 34 and rotation axis of the main body of the rotor so as to keep smooth rotation.

14 Claims, 2 Drawing Sheets

METHOD OF PROCESSING ROTOR

BACKGROUND OF THE INVENTION

The present invention relates to a method of processing a rotor and to, a motors and a hard disk drive unit.

A motor used for a hard disk drive unit has a construction in which a rotor is cap-shaped as a whole and a magnet is assembled at the inside of the cap-shaped rotor through a ring-shaped yoke, or is attached to the rotor directly because a shaft portion where hard disks are attached is integrally formed with the rotor of the motor.

In the constitution in which the shaft portion for attaching a driven body to the rotor is formed like integrally that described above, it is neccessary for a center line of the ring-shaped magnet attached at the inside of the cap-shaped rotor, a center line of the shaft portion, and a center line of an attaching hole for attaching the shaft to support the rotor to rotatively match.

However, in the prior method of processing this kind of rotor, it has been difficult to match center lines of these parts because the main body of the rotor and the magnet are produced in separated proceed and the magnet is attached after attaching the yoke to the completed main body of the rotor.

Thus, a magnetic gap formed between the magnet of the rotor and the core of coil of a stator does not become uniform when the rotor is assembled with the stator, rotation of the rotor and rotation of the driven body formed at a shaft portion of the rotor lack smoothness, and an inconvenience exist in that vibration is generated and the sound of rotation becomes large or is likely to occur.

Therefore, when a hard disk driving unit is constructed using this kind of motor, the motor had a problem in that such an inconvenience occurs during an operation of reading out and writing data.

An object of the present invention is to provide a method of processing a rotor of a motor, a motor, and a hard disk driving unit using the motor to provide smooth rotation of the driven body formed at the rotor and the shaft portion of the rotor.

SUMMARY OF THE INVENTION

According to a first aspect of the invention, a method of processing a rotor comprises a step of forming a shaft portion outside of a main body of the cap-shaped rotor as a whole and a step attaching a ring-shaped magnet at the inside of the main body of the rotor. Further, a method of working an attaching hole of the shaft fixed at the shaft portion and the main body of the rotor standardizing the inner circumferential face of the magnet is provided.

By performing the required working for standardizing the inner circumferential face of the magnet after attaching the magnet at the main body of the rotor, the center line of the magnet, rotation axis of the main body of a rotor, and the center line of the shaft portion can be matched easily and accurately. As a result, in the case that the motor is assembled with a stator, magnetic gap formed between the rotor and the stator can be uniform and smooth rotation of the driven body formed at the rotor and the shaft portion of the rotor can be maintained so as to decrease the sound of rotation.

According to the present invention, a hard disk drive unit in which a motor using the rotor manufactured like that above-described is constituted and magnetic disks are fixed at the main body of the rotor.

DETAILED DESCRIPTION OF THE PRESENT INVENTION

Referring to the attached figures, an example of an embodiment of the present invention will be described in detail.

Figure 1:
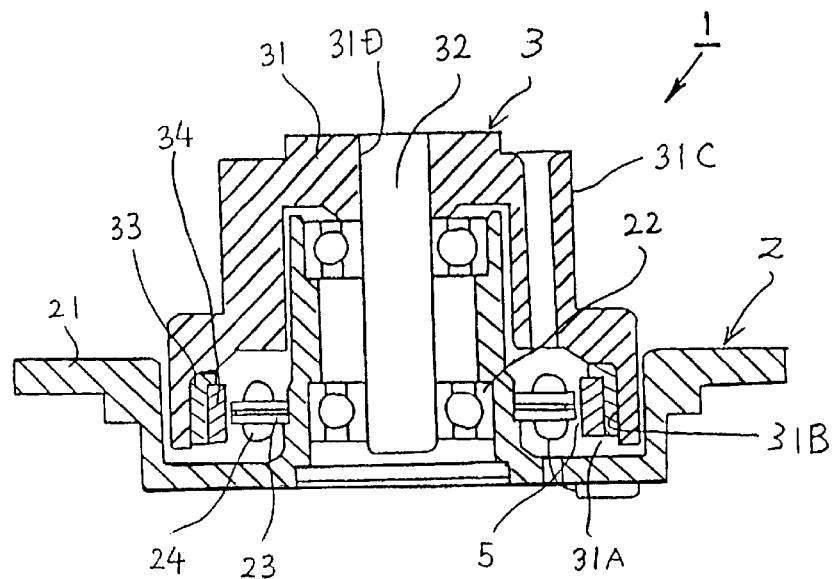
FIG. 1 is a sectional side view showing an example of an embodiment of a motor according to the present invention.

FIG. 1 is a sectional view showing an embodiment of a motor according to the present invention. A motor 1 is an example of a motor for a hard disk drive unit, and comprises a stator 2 and a rotor 3.

In the stator 2, a stator coil 24 is wound at a core 23 attached at a lower side of ball bearings 22 formed in one body at a center portion of a frame 21 with a suitable means.

The rotor 3 has a cap-shaped main body 31 arranged so as to cover the ball bearings 22, and is supported rotatively to the stator 2 by a shaft 32 fixed by an attaching hole 31D bored at the center of the cap-shaped main body of the rotor 31. Magnetic disks (not shown) are attached at a shaft portion 31C of the main body of the rotor 31 as a driven body.

A ring-shaped yoke 33 and a ring-shaped magnet 34 are arranged at the inner circumferential face 31B of an opening portion 31A in the cap-shaped main body of the rotor 31.

Figure 2:
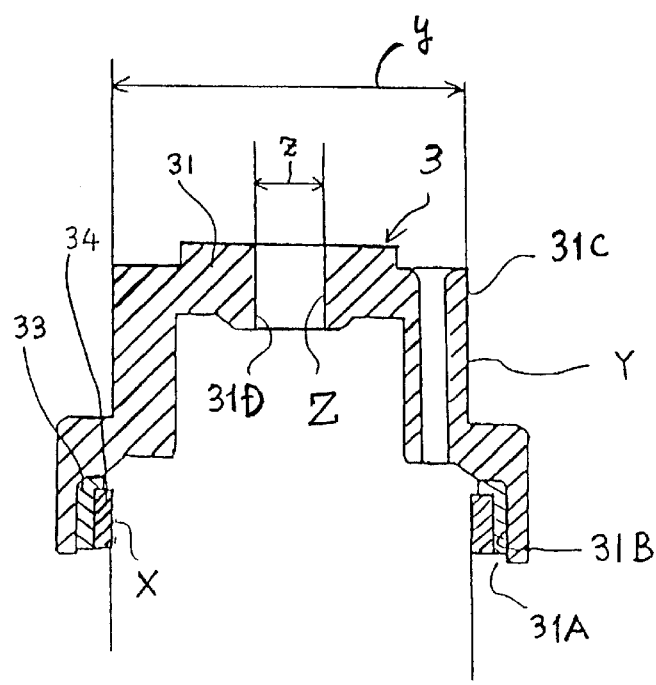
FIG. 2 is a sectional side view for describing a method of processing the rotor shown in FIG. 1.

Next, referring to FIG. 2, a method of processing the rotor 3 shown in FIG. 1 will be described. The outer circumferential of the shaft portion 31C of the main body of the rotor 31 and the inner circumferential face Z of the attaching hole 31D are worked for standardizing inner the circumference X of the magnet 34 after the yoke and the magnet are fixed at a predetermined position of inner circumference face 31B of the cap-shaped rotor main body 31.

In these processes, the inner circumferential face X of the magnet 34, for example, is fixed at a chuck of a lathe and is worked by machining the outer circumferential face Y of the shaft portion 31C so that the outside dimension of the shaft portion 31C becomes the predetermined dimension y.

According to the above process, it is possible to match rotation centerlines of the magnet 34, the shaft portion 31C, and the a attaching hole 31D at a high accuracy. When the motor is constituted by attaching a shaft 32 into the attaching hole 31D and bearing 22 the rotor with the ball bearings 22, a magnetic gap becomes uniform, and smooth rotation of the magnetic disks 41 formed at the rotor 3 and the shaft portion 31C are obtained. Moreover, the sound of rotation can be decreased.

Although the magnet fixed at the inner circumferential face 31B of the opening portion 31A of the cap-shaped rotor main body 31 through the yoke 33 is shown in the embodiment of FIG. 1, the present invention can apply to a motor directly fixing a magnet 34 at the inner circumferential face 31B so as to obtain the similar effect.

In the main body of a rotor 31 shown in FIG. 1, the shaft 32 is attached at the attaching hole 31D, and the shaft 32 attaches the main body of the rotor 31 rotatively at the stator 2. However, the invention is not applied only to this type of the present rotor, and it is applicable similarly a type in which the attaching hole 31D is attached at a bearing and the main body of the rotor 31 is attached rotatively at the stator using the bearing so as to obtain a similar effect.

Figure 3:
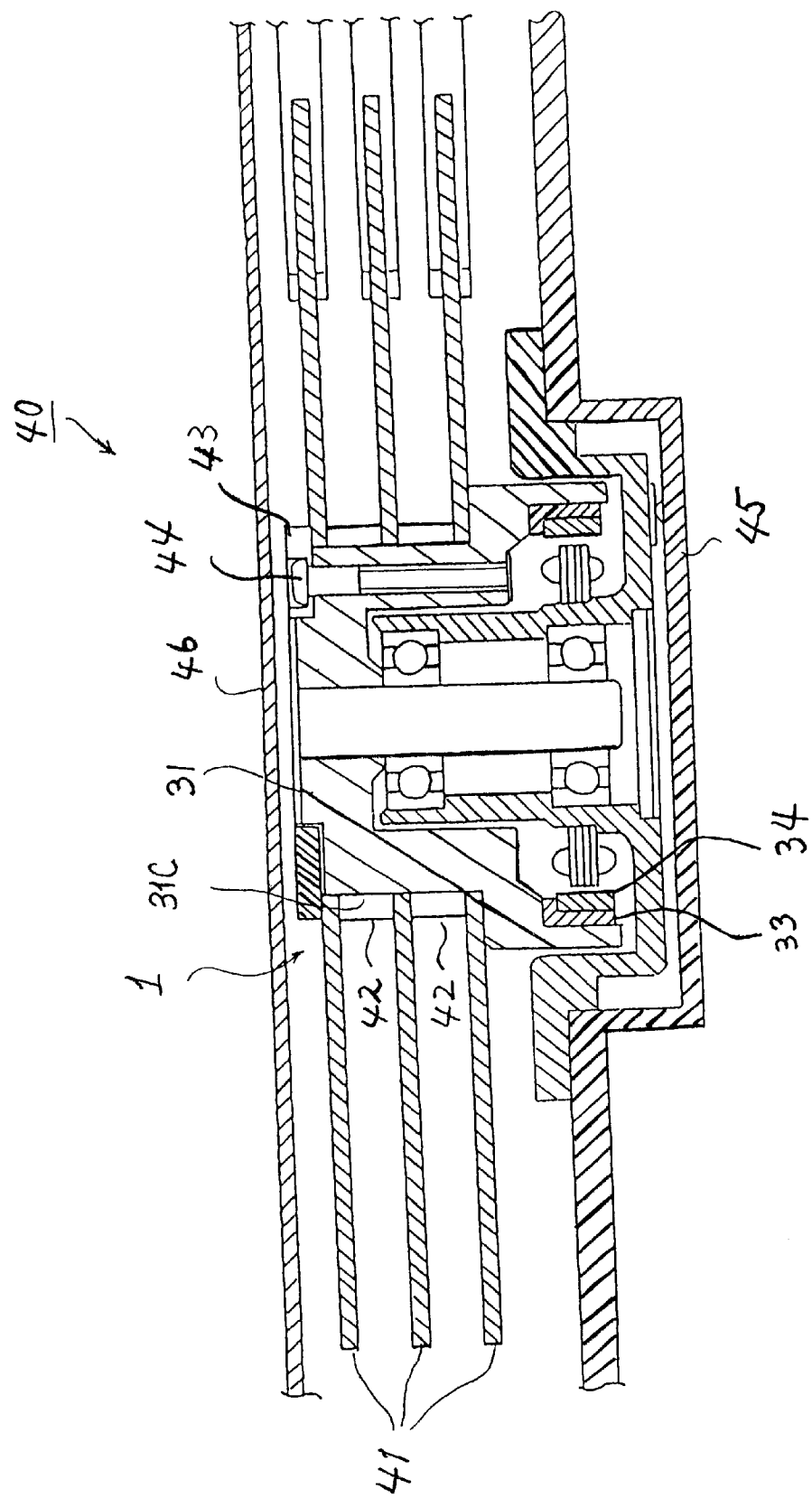
FIG. 3 is a sectional side view showing an example of an embodiment of a hard disk driving unit constituted using the motor shown in FIG. 1 according to the present invention.

FIG. 3 is a sectional view showing an example of a hard disk drive unit using the motor 1 shown in FIG. 1 according to the present invention.

In the hard disk drive unit 40, plural disk-shaped magnetic disks 41 fit the shaft portion 31C of the rotor main body 31 of the motor 1 and are arranged at predetermined intervals using spacers 42 formed between the magnetic disks 41. A part shown with symbol 43 is a disk cramp fixed at the shaft portion 31C by bolts 44, and fixes the magnetic disks 41 and the spacers 42 at the shaft portion 31C in a predetermined state. The motor 1 fixing the magnetic disks as described above is attached at a chassis 45 and is sealed in a case attaching a cover 46.

According to the hard disk drive unit 40, as the magnet 34 of the motor 1 is high in concentricity to the center of rotation and is also high in circularity, electric, characteristics are excellent and the magnetic disks 41 can be rotated at the required ideal state. As a, result, a high-performance hard disk drive unit 40 can be obtained.

According to the present invention, as the needed process standardizing the inner circumferential of the magnet is carried out after attaching the magnet at the main body of the rotor and the, center line of the magnet, the rotation axis of the main body of the rotor, and the center line of the shaft portion can be matched easily and accurately. Therefore, a magnetic gap formed between the rotor and the stator becomes uniform and smooth rotation of the driven body formed at the rotor and the rotor shaft portion can be maintained so as to decrease the sound of rotation. As a hard disk drive unit using the inventive motor can rotate and drive the magnetic disks stably at the ideal state, a high-performance hard disk drive unit 40 can be obtained.

What is claimed is:

1. A method of processing a rotor of a motor, comprising the steps of:
    forming a shaft portion at an outside surface of a cap-shaped main body of the rotor; and
    attaching a ring-shaped magnet at an inside surface of the main body of the rotor;
    wherein the shaft portion and either a shaft formed at the main body of the rotor or a central attaching hole for attaching bearings are formed such that the outer diameter of the shaft portion is the same as the diameter of the inner circumferential surface of the magnet after the magnet is attached at the inside surface of the main body of the rotor.

2. A method according to claim 1; further comprising the step of interposing a ring-shaped yoke between the inside surface of the main body of the rotor and the magnet.

3. A method according to claim 2; further comprising the step of forming the yoke and the magnet into a single body by pressing the ring-shaped magnet into an inside surface of the yoke.

4. A method according to claim 1; further comprising the steps of providing a stator having a stator coil over which an open end of the rotor is disposed so that the magnet opposes the stator coil when the rotor and the stator are assembled; and providing a bearing to rotationally support the rotor with respect to the bearing.

5. A method according to claim 4; further comprising the step of forming a central hole in the rotor so that rotational axes of the shaft, the magnet and the central hole are aligned.

6. A method according to claim 4; further comprising the steps of forming a central hole in the rotor so that rotational axes of the shaft, the magnet and the central hole are aligned; providing a cylindrical shaft extending through the central hole; and fixedly attaching the shaft to one of the rotor and the stator so as to undergo rotational movement therewith, the shaft passing through the bearing so as to permit rotational movement between the rotor and the stator.

7. A method of producing a motor comprising, the steps of:
    providing a stator having a stator coil;
    providing a rotor;
    attaching a ring-shaped magnet to an internal surface of the rotor so as to oppose the stator coil when the motor is assembled; and
    forming a cylindrically-shaped shaft at an external surface of the rotor so that the outer diameter of the shaft is the same as the diameter of the inner circumferential surface of the magnet when the magnet is attached at the internal surface of the rotor.

8. A method according to claim 7; further comprising the step of interposing a ring-shaped yoke between the inside surface of the main body of the rotor and the magnet.

9. A method according to claim 8; further comprising the step of forming the yoke and the magnet into a single body by pressing the ring-shaped magnet into an inside surface of the yoke.

10. A method according to claim 7; further comprising the step of providing a bearing to rotationally support the rotor with respect to the bearing.

11. A method according to claim 10; further comprising the step of forming a central hole in the rotor so that rotational axes of the shaft, the magnet and the central hole are aligned.

12. A method according to claim 10; further comprising the steps of forming a central hole in the rotor so that rotational axes of the shaft, the magnet and the central hole are aligned; providing a cylindrical shaft extending through the central hole; and fixedly attaching the cylindrical shaft to one of the rotor and the stator so as to undergo rotational movement therewith, the shaft passing through the bearing so as to permit rotational movement between the rotor and the stator.

13. A method according to claim 7; further comprising the step of attaching one or more magnetic disks to the outer surface of the cylindrically-shaped shaft.

14. A method according to claim 7; further comprising the step of attaching plural magnetic disks to the outer surface of the shaft with ring-shaped spacers between the respective magnetic disks.

* * * * *